United States Patent
Ide

(10) Patent No.: US 7,187,388 B2
(45) Date of Patent: Mar. 6, 2007

(54) SPREADSHEET DATA MANIPULATION OF TWO-DIMENSIONAL DATA STRUCTURES WITH RECORDING CAPABILITY AND ACTIVATION MEANS

(75) Inventor: Takashi Ide, Kobe (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 09/781,963

(22) Filed: Feb. 14, 2001

(65) Prior Publication Data

US 2002/0039107 A1 Apr. 4, 2002

(30) Foreign Application Priority Data

Sep. 29, 2000 (JP) .............................. 2000-301151

(51) Int. Cl.
 *G09G 5/00* (2006.01)
(52) U.S. Cl. ...................... 345/619; 345/625; 345/628; 345/629
(58) Field of Classification Search ................ 345/674, 345/619, 854, 665, 440, 672, 673, 625, 628, 345/629; 715/503–510, 512–514, 517, 523, 715/526, 904–905; 707/101, 1, 100, 102, 707/2, 3, 6, 7, 200, 201, 104.1
See application file for complete search history.

(56) References Cited

U.S. PATENT DOCUMENTS

| | | | | |
|---|---|---|---|---|
| 6,112,209 A | * | 8/2000 | Gusack | 707/101 |
| 6,138,130 A | * | 10/2000 | Adler et al. | 715/503 |
| 6,262,736 B1 | * | 7/2001 | Nelson | 345/854 |

OTHER PUBLICATIONS

Jennings, Roger, et al. "Special Edition Using Access 95." 1995, Que Corporation, Indianapolis, IN.*

* cited by examiner

Primary Examiner—Kee M. Tung
Assistant Examiner—Mike Rahmjoo
(74) Attorney, Agent, or Firm—Staas & Halsey LLP

(57) ABSTRACT

In a two-dimensional data processing technique according to the present invention, there is provided a mechanism for inputting two-dimensional data, and for outputting a piece of two-dimensional data after subjected selectively to one of a plurality of predefined operations to a row or a column of the two-dimensional data; operation contents comprising an operation type which specifies the operation to be performed by the mechanism, an input target and an output target are designated; and at least one piece of operation contents is recorded in the designation order of the operation contents.

12 Claims, 27 Drawing Sheets

FIG.25

| FILE OPEN | | | | |
|---|---|---|---|---|
| RETRIEVE(I): sample | | | | OPEN(O) |
| | | | | CANCEL |
| | | | | ADVANCED(A) |
| NAME | SIZE | TYPE | MODIFIED | |
| MINAGAWA.xls | 18KB | Microsoft Exce... | 00/03/07 23:02 | |
| SATO.xls | 17KB | Microsoft Exce... | 00/03/07 23:01 | |
| sample.xls | 26KB | Microsoft Exce... | 00/08/07 13:18 | |

FIND FILES THAT MATCH THESE SEARCH CONDITION

| FILE NAME(N): | | TEXT OR PROPERTY(X): | | FIND NOW(F) |
|---|---|---|---|---|
| FILE OF TYPE(T): | ALL FILES (*.*) | LAST MODIFIED(M): | ANY TIME | NEW SEARCH(W) |

3 FILE(s) FOUND

| | A | B | C | D | E | F | G | H | I | J | K |
|---|---|---|---|---|---|---|---|---|---|---|---|
| 1 | 1ST DEV.DEP | GS/SURE | 363220 | I.AOKI | TCP/IP SUMMARY | S.B.O | | 2 EACH PLACE | | | |
| 2 | 1ST DEV.DEP | GS/SURE | 363220 | I.AOKI | UNIX SYSTEM CALL PROGRAMMING | S.B.O | | 11 TECH | | | |
| 3 | 1ST DEV.DEP | GS/SURE | 363220 | I.AOKI | UNIX NETWORK PROGRAMMING | S.B.O | | 11 TECH | | ◎ | |
| 4 | 1ST DEV.DEP | GS/SURE | 363220 | I.AOKI | BASIS OF PROGRAM DEVELOPMENT ON UNIX | S.B.O | | 12 NUMAZU | | ○ | |
| 5 | 1ST DEV.DEP | GS/SURE | 363220 | I.AOKI | BASIS OF MULTITHREAD PROGRAMMING BY WIN32API | S.B.O | | 10 NUMAZU | | | |
| 6 | 1ST DEV.DEP | GS/SURE | 363220 | I.AOKI | BASIS OF DATA STRUCTURE | S.B.O | | 11 TECH | | | |
| 7 | 1ST DEV.DEP | GS/SURE | 363220 | I.AOKI | BASIS OF DATA STRUCTURE | S.B.O | | 3 NUMAZU | | | |
| 8 | 1ST DEV.DEP | GS/SURE | 363220 | I.AOKI | REVIEW TECHNIQUE | S.B.O | | 12 CORRESPONDENCE | | | |
| 9 | 1ST DEV.DEP | GS/SURE | 363220 | I.AOKI | QUALITY CONTROL TECHNIQUE FOR LEADERS | S.B.O | | 12 NUMAZU | | ● | |
| 10 | 1ST DEV.DEP | GS/SURE | 363220 | I.AOKI | PROJECT SIMULATION | S.B.O | | 2 CAMP | | | |
| 11 | 1ST DEV.DEP | GS/SURE | 363220 | I.AOKI | PROJECT SIMULATION | S.B.O | | 3 CAMP | | | |
| 12 | 1ST DEV.DEP | GS/SURE | 363220 | I.AOKI | DIRECTING AND EDUCATING SUBORDINATE | S.B.O | | | | | |
| 13 | 1ST DEV.DEP | GS/SURE | 363220 | I.AOKI | PROBLEM FINDING AND SOLVING SKILL | S.B.O | | 1 TECH | | | |
| 14 | 1ST DEV.DEP | GS/SURE | 363220 | I.AOKI | SUBJECT FINDING ABILITY IMPROVEMENT FOR IMPROVED PROFIT | S.B.O | | 2 OSAKA | | | |
| 15 | 1ST DEV.DEP | GS/SURE | 363220 | I.AOKI | REVIEW TEST TECHNIQUE IN PROGRAM DEVELOPMENT | FLM | 11,2 | OSAKA | | | |
| 16 | 1ST DEV.DEP | GS/SURE | 363220 | I.AOKI | PARTS REUSAGE TECHNIQUE IN PROGRAM DEVELOPMENT | FLM | EVERY MONTH | OSAKA,TOKYO | | | |
| 17 | 1ST DEV.DEP | GS/SURE | 363220 | I.AOKI | SQL GUIDE | FLM | EVERY MONTH | TOKYO(OSAKA) | | | |
| 18 | 1ST DEV.DEP | GS/SURE | 363220 | I.AOKI | BASIS OF NETWORK | FLM | EVERY MONTH | TOKYO(OSAKA) | | | |
| 19 | 1ST DEV.DEP | GS/SURE | 363220 | I.AOKI | DESIGN PRACTICE OF LAN | FLM | EVERY MONTH | TOKYO(OSAKA) | | | |
| 20 | 1ST DEV.DEP | GS/SURE | 363220 | I.AOKI | DESIGN PRACTICE OF WAN | FLM | EVERY MONTH | TOKYO(OSAKA) | | | |
| 21 | 1ST DEV.DEP | GS/SURE | 363220 | I.AOKI | BASIS OF UNIX NETWORK | FLM | EVERY MONTH | TOKYO | | | |
| 22 | 1ST DEV.DEP | GS/SURE | 363220 | I.AOKI | UNIX NETWORK PROGRAMMING | FLM | 11,2 | TOKYO(OSAKA) | | | |
| 23 | 1ST DEV.DEP | GS/SURE | 363220 | I.AOKI | BASIS OF WINDOWS NT | FLM | EVERY MONTH | TOKYO(OSAKA) | | ◎ | |
| 24 | 1ST DEV.DEP | GS/SURE | 363220 | I.AOKI | BASIS OF PROJECT MANAGEMENT | FLM | EVERY MONTH | TOKYO(OSAKA) | | ○ | |
| 25 | 1ST DEV.DEP | GS/SURE | 363220 | I.AOKI | BASIS OF EVALUATION DEVELOPMENT PLAN AND MANAGEMENT FOR LEADERS | FLM | EVERY MONTH | TOKYO | | | |
| 26 | 1ST DEV.DEP | GS/SURE | 363220 | I.AOKI | SYSTEM QUALITY MANAGEMENT WORKSHOP | FLM | | 2 TOKYO | | | |
| 27 | 1ST DEV.DEP | GS/SURE | 363220 | I.AOKI | PSYCHOLOGY AND ORGANIZATION THEORY FOR LEADERS | FLM | 11,2 | TOKYO | | | |
| 28 | 1ST DEV.DEP | GS/SURE | 363220 | I.AOKI | ACTION TRAINING FOR LEADERS | FLM | | | | | |
| 29 | 1ST DEV.DEP | GS/SURE | 363220 | I.AOKI | RISK MANAGEMENT WORKSHOP | FLM | 12,1 | TOKYO | | | |
| 30 | 1ST DEV.DEP | GS/SURE | 363220 | I.AOKI | DEBATING TECHNIQUE | S.B.O | | 2 TECH | | | |

FIG.33

| | A | B | C | D | E | F | G | H | I | J | K |
|---|---|---|---|---|---|---|---|---|---|---|---|
| 1 | 1ST DEV. DEP | GS/SURE | 363220 | I. AOKI | UNIX NETWORK PROGRAMMING | S.B.O | | 11 TECH | | ◎ | |
| 2 | 1ST DEV. DEP | GS/SURE | 363220 | I. AOKI | PSYCHOROGY AND ORGANIZATION THEORY FOR LEADERS | FLM | 11.2 | TOKYO | | ◎ | |
| 3 | 1ST DEV. DEP | GS/SURE | 363213 | J. ADACHI | PEOPLE RELATION TRAINING LECTURE | FLM | | | | ◎ | |
| 4 | 1ST DEV. DEP | GS/SURE | 363213 | J. ADACHI | NEGOTIATION SKILL-UP | FLM | | | | ◎ | |
| 5 | 1ST DEV. DEP | GS/SURE | 371704 | S. ARAI | BASIS OF EVALUATION DEVELOPMENT PLAN AND MANAGEMENT FOR LEADERS | FLM | 11.1.3 | TOKYO | | ◎ | |
| 6 | 1ST DEV. DEP | GS/SURE | 392272 | S. IKEDA | PSYCHOLOGY AND ORGANIZATION THEORY FOR LEADERS | FLM | 11.2 | TOKYO | | ◎ | |
| 7 | 1ST DEV. DEP | GS/SURE | 392282 | G. ISHII | PSYCHOLOGY AND ORGANIZATION THEORY FOR LEADERS | FLM | 11.2 | TOKYO | | ◎ | |
| 8 | 1ST DEV. DEP | GS/SURE | 382076 | R. INOUE | JAVA PROGRAMMING GUIDE | FLM | | | | ◎ | |
| 9 | 1ST DEV. DEP | GS/SURE | 382076 | R. INOUE | JAVA APPLET GUIDE(VOD) | S.B.O | | | | ◎ | |
| 10 | 1ST DEV. DEP | GS/SURE | 402634 | S. IWAKI | SOFTWARE DEVELOPMENT AND PATENT | S.B.O | | 1 TECH | | ◎ | |
| 11 | 1ST DEV. DEP | GS/SURE | 363248 | H. UEDA | BASIS OF SOFTWARE DEVELOPMENT ON UNIX | FLM | 11.2 | 12 NUMAZU | | ◎ | |
| 12 | 1ST DEV. DEP | GS/SURE | 363248 | H. UEDA | PSYCHOLOGY AND ORGANIZATION THEORY FOR LEADERS | FLM | 11.2 | TOKYO | | ◎ | |
| 13 | 1ST DEV. DEP | GS/SURE | 371724 | K. ENDO | PROBLEM FINDING AND SOLVING ABILITY | S.B.O | | | | ◎ | |
| 14 | 1ST DEV. DEP | GS/SURE | 414406 | J. OMORI | C++GUIDE | H.R | | 12 EDUCATION CENTER(EC) | | ◎ | |
| 15 | 1ST DEV. DEP | GS/SURE | 414406 | J. OMORI | CORBA | | | | | ◎ | |
| 16 | 1ST DEV. DEP | GS/SURE | 425929 | J. OCHI | POINT OF SOFTWARE-RELATED PAT. APPLN. | S.B.O | | | | ◎ | |
| 17 | 1ST DEV. DEP | GS/SURE | 425929 | J. OCHI | BASIS OF PAT. APPLN. | S.B.O | | 3 NUMAZU | | ◎ | |
| 18 | 1ST DEV. DEP | GS/SURE | 402646 | J. OHARA | VISUAL BASIC GUIDE | S.B.O | | 12 NUMAZU | | ◎ | |
| 19 | 1ST DEV. DEP | GS/SURE | 480159 | J. KAWAMOTO | BASIS OF SOFTWARE DEVELOPMENT ON UNIX | S.B.O | | | | ◎ | |
| 20 | 1ST DEV. DEP | GS/SURE | 480159 | J. KAWAMOTO | BASIS OF UNIX NETWORK | FLM | EVERY MONTH | TOKYO(OSAKA) | | ◎ | |
| 21 | 1ST DEV. DEP | GS/SURE | 480159 | J. KAWAMOTO | HOW TO MAKE SHELL SCRIPT(FOR BEGINNER) | S.B.O | | 2 CORRESPONDENCE | | | |

| | A | B | C | D | E | F | G | H | I |
|---|---|---|---|---|---|---|---|---|---|
| 1 | C++GUIDE | | | | | | | | |
| 2 | CORBA | 1 | | | | | | | |
| 3 | JAVA APPLET GUIDE(VOD) | 1 | | | | | | | |
| 4 | JAVA PROGRAMMING GUIDE | 1 | | | | | | | |
| 5 | BASIS OF UNIX NETWORK | 1 | | | | | | | |
| 6 | UNIX NETWORK PROGRAMMING | 1 | | | | | | | |
| 7 | BASIS OF PROGRAMMING DEVELOPMENT ON UNIX | 2 | | | | | | | |
| 8 | VISUAL BASIC GUIDE | 1 | | | | | | | |
| 9 | HOW TO MAKE SHELL SCRIPT(FOR BEGINNER) | 1 | | | | | | | |
| 10 | SOFTWARE DEVELOPMENT AND PATENT | 1 | | | | | | | |
| 11 | POINT OF SOFTWARE-RELATED PAT. APPLN. | 1 | | | | | | | |
| 12 | NEGOTIATION SKILL-UP | | | | | | | | |
| 13 | BASIS OF EVALUATION DEVELOPMENT PLAN AND MANAGEMENT FOR LEADERS | 1 | | | | | | | |
| 14 | PSYCHOLOGY AND ORGANIZATION THEORY FOR LEADERS | 4 | | | | | | | |
| 15 | PEOPLE RELATION TRAINING LECTURE | 1 | | | | | | | |
| 16 | BASIS OF PAT. APPLN. | 1 | | | | | | | |
| 17 | PROBLEM FINDING AND SOLVING SKILL | 1 | | | | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | | | | | | |
| 25 | | | | | | | | | |
| 26 | | | | | | | | | |
| 27 | | | | | | | | | |
| 28 | | | | | | | | | |
| 29 | | | | | | | | | |
| 30 | | | | | | | | | |

| | A | B | C | D | E | F | G | H | I |
|---|---|---|---|---|---|---|---|---|---|
| 1 | FILE CAPTURING | f:¥sample¥sample.xls | XLSheet0 | XLSheet0 | | | | | |
| 2 | ROW-TO-COLUMN CONVERSION | XLSheet0 | XLSheet1 | 5 | 4 | | | | |
| 3 | VALUE-DESIGNATED ROW EXTRACTION | XLSheet1 | XLSheet2 | 10 | ◎ | | | | |
| 4 | KEYED TOTALIZATION | XLSheet2 | XLSheet3 | 5 | | | | | |
| 5 | | | | | | | | | |
| 6 | | | | | | | | | |
| 7 | | | | | | | | | |
| 8 | | | | | | | | | |

| | A | B | C | D | E | F | G | H | I |
|---|---|---|---|---|---|---|---|---|---|
| 1 | FILE CAPTURING | % | XLSheet0 | XLSheet0 | | | | | |
| 2 | ROW-TO-COLUMN CONVERSION | XLSheet0 | XLSheet1 | | 5 | | | | |
| 3 | VALUE-DESIGNATED ROW EXTRACTION | XLSheet1 | XLSheet2 | | 10 ◎ | 4 | | | |
| 4 | KEYED TOTALIZATION | XLSheet2 | XLSheet3 | | 5 | | | | |
| 5 | | | | | | | | | |

74 script

FIG.40

| FILE OPEN | | | | |
|---|---|---|---|---|
| RETRIEVE(I): sample | | | | OPEN(O) |
| | | | | CANCEL |
| | | | | ADVANCED(A) |
| NAME | SIZE | TYPE | MODIFIED | |
| MINAGAWA.xls | 18KB | Microsoft Exce... | 00/03/07 23:02 | |
| SATO.xls | 17KB | Microsoft Exce... | 00/03/07 23:01 | |
| sample.xls | 26KB | Microsoft Exce... | 00/08/07 13:18 | |

FIND FILES THAT MATCH THESE SEARCH CONDITION

FILE NAME(N):     TEXT OR PROPERTY(X):     FIND NOW(F)

FILE OF TYPE(T): ALL FILES (*.*)     LAST MODIFIED(M): ANY TIME     NEW SEARCH(W)

3 FILE(s) FOUND

| | A | B | C | D | E | F | G | H | I | J | K | L | M | N | O |
|---|---|---|---|---|---|---|---|---|---|---|---|---|---|---|---|
| 1 | | | | | | | | | | | | | | | |
| 2 | | | | TRAINING TYPE | S.B.O | S.B.O | S.B.O | S.B.O | H.R. | H.R. | | | | |
| 3 | | | | HELD MONTH | | | | | | | | | | |
| 4 | | | | HELD PLACE | TCP/IP SUMMARY | MIDDLE CLASS JAVA PROGRAMMING (LOD) | WINDOWS APPLICATION DEVELOPMENT BY MFC | JAVA BEENS COMPONENT DEVELOPMENT | C++GUIDE | C LANGUAGE PROGRAMMING | | | | |
| 5 | SECTION | PROJECT | EMPLOYEE NO. | NAME | | | | | | | | | | |
| 6 | 3RD DEV. DEP | SOURCE DISTRIBUTION TECHNIQUE | 363207 | I. KIMURA | | | | | | | | | | |
| 7 | 3RD DEV. DEP | SOURCE DISTRIBUTION TECHNIQUE | 752495 | S. KAKIZOE | | | | | ◎ | | | | | |
| 8 | 3RD DEV. DEP | SOURCE DISTRIBUTION TECHNIQUE | 363212 | Y. KONISHI | ◎ | ● | ◎ | ○ | | | | | | |
| 9 | 3RD DEV. DEP | SOURCE DISTRIBUTION TECHNIQUE | 414405 | K. SHIMADA | | ◎ | | ◎ | | | | | | |
| 10 | 3RD DEV. DEP | SOURCE DISTRIBUTION TECHNIQUE | 424873 | Y. SEZAKI | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16 | | | | | | | | | | | | | | | |
| 17 | | | | | | | | | | | | | | | |
| 18 | | | | | | | | | | | | | | | |
| 19 | | | | | | | | | | | | | | | |
| 20 | | | | | | | | | | | | | | | |
| 21 | | | | | | | | | | | | | | | |
| 22 | | | | | | | | | | | | | | | |
| 23 | MINAGAWA | | | | | | | | | | | | | | |

FIG.42

| | A | B | C | D | E | F | G | H | I | J | K | L | M | N |
|---|---|---|---|---|---|---|---|---|---|---|---|---|---|---|
| 1 | | | | | | | | | | | | | | |
| 2 | | | | | | | | | | | | | | |
| 3 | | | | | TCP/IP SUMMARY | DEBATING TECHNIQUE | STATE TRANSITION DIAGRAM AND LANGUAGE THEORY | MIDDLE CLASS JAVA PROGRAMMING | REVIEW TECHNIQUE | | | | | |
| 4 | SECTION | PROJECT | EMPLOYEE NO. | TRAINING TYPE | S.B.O | S.B.O | S.B.O | S.B.O | S.B.O | | | | | |
| | | | | HELD MONTH | | | | | | | | | | |
| | | | | HELD PLACE | | | | | | | | | | |
| 5 | | | | NAME | | | | | | | | | | |
| 6 | 2ND DEV. DEP | LINKEXPRESS NEXT TERM | 870510 | M.SAKAI | ◎ | | | | | | | | | |
| 7 | 2ND DEV. DEP | LINKEXPRESS NEXT TERM | 363216 | T.SEKINE | | | ◎ | | | | | | | |
| 8 | 2ND DEV. DEP | LINKEXPRESS NEXT TERM | 371711 | T.TAKENAKA | | ○ | | | | | | | | |
| 9 | 2ND DEV. DEP | LINKEXPRESS NEXT TERM | 392283 | K.SASAE | | | | ● | □ | | | | | |
| 10 | | | | | | | | | | | | | | |
| 11 | | | | | | | | | | | | | | |
| 12 | | | | | | | | | | | | | | |
| 13 | | | | | | | | | | | | | | |
| 14 | | | | | | | | | | | | | | |
| 15 | | | | | | | | | | | | | | |
| 16 | | | | | | | | | | | | | | |
| 17 | | | | | | | | | | | | | | |
| 18 | | | | | | | | | | | | | | |
| 19 | | | | | | | | | | | | | | |
| 20 | | | | | | | | | | | | | | |
| 21 | | | | | | | | | | | | | | |
| 22 | | | | | | | | | | | | | | |
| 23 | | | | | | | | | | | | | | |

SATO

FIG. 43

| | A | B | C | D | E | F | G | H | I |
|---|---|---|---|---|---|---|---|---|---|
| 1 | C++GUIDE | 1 | | | | | | | |
| 2 | JAVA BEENS COMPONENT DEVELOPMENT | 1 | | | | | | | |
| 3 | WINDOWS APPLICATION DEVELOPMENT BY MFO | 1 | | | | | | | |
| 4 | TCP/IP SUMMARY | 2 | | | | | | | |
| 5 | STATE TRANSITION DIAGRAM AND LANGUAGE THEORY | 1 | | | | | | | |
| 6 | MIDDLE CLASS JAVA PROGRAMMING(LOD) | 1 | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | | | | | | |
| 25 | | | | | | | | | |
| 26 | | | | | | | | | |
| 27 | | | | | | | | | |
| 28 | | | | | | | | | |

XLSheet3

FIG.44

| | A | B | C |
|---|---|---|---|
| 1 | XLSheet0 | F:¥sample¥MINAGAWA.xls | |
| 2 | XLSheet1 | F:¥sample¥SATO.xls | |

82

SPREADSHEET DATA MANIPULATION OF TWO-DIMENSIONAL DATA STRUCTURES WITH RECORDING CAPABILITY AND ACTIVATION MEANS

BACKGROUND OF THE INVENTION (1) Field of the Invention

The present invention relates to a technique for processing two-dimensional data, and more particularly to a technique for simultaneously establishing manipulative capability and data-reusability.

(2) Related art of the Invention

Recently, there have been widely used spreadsheet software allowing easy entry, totalization and analysis of data on a display screen. Such spreadsheet software are characterized in that manipulative capability thereof is superior to that of database management software since data manipulation is performed in a human-understandable tabular format.

As an example of a usage situation of spreadsheet software such as in business, there can be perceived such a situation that monthly received orders of respective branches are gathered to a main office, and the ordered numbers for each commercial product are totalized there. In this case, the totalization of the ordered numbers for each commercial product is performed monthly. For the purpose of performing automatically such a regular task, a spreadsheet program is provided with a macro function. In such a macro function, manipulations for a regular task procedure are to be registered, and these registered manipulations are later invoked and executed as required, to thereby automatically perform the regular task.

Macro functions are useful for rendering a regular task to be automatically executed, insofar as concerned with tabular format data (two-dimensional data) having the same caption layout. However, there is a problem as follows. Namely, since macro functions assume manipulations for respective cells, macro functions cannot be applied to tabular format data if the data includes a slightly different number of rows and/or slightly different caption layout of columns. To cope with caption layouts different to each other, it is not impossible to realize a macro function by using a programming language. However, this requires knowledge comparable to development of application software, which can be hardly performed by a general user. Summarizing the above, spreadsheet software have involved such a problem that data reuse is difficult though the manipulative capability is excellent.

Meanwhile, there exists a way to re-input tabular format data into a relational database, and to utilize queries to thereby totalize the ordered numbers for each commercial product. Although the relational database is utilized so that data can be reused, there is required specialized knowledge for a table design and a query definition. Namely, the method to utilize a relational database has involved such a problem that the manipulative capability is not excellent though data is readily reused.

The present invention has been carried out in view of the conventional problems as described above, and it is therefore an object of the present invention to provide a two-dimensional data processing technique in which various totalization of tabular format data can be performed while keeping the tabular format, to thereby simultaneously establish manipulative capability and data-reusability.

SUMMARY OF THE INVENTION

To this end, in a two-dimensional data processing technique according to the present invention, there is provided a mechanism for inputting two-dimensional data, and for outputting a piece of two-dimensional data after subjected selectively to one of a plurality of predefined operations to a row or a column of the two-dimensional data; operation contents comprising an operation type which specifies the operation to be performed by the mechanism, an input target and an output target are designated; and at least one piece of operation contents is recorded in the designation order of the operation contents. Further, the recorded operation contents are sequentially read out, and one operation is selectively activated from among the plurality of operations based on the operation type, input target and output target. In this case, the operation contents may be recorded as two-dimensional data.

According to such a constitution, in performing totalization (including averaging, calculating maximum value, counting and the like) in a manner conforming to a predetermined rule for two-dimensional data, when one of a plurality of previously predefined operations is selectively applied to the two-dimensional data, the operation result is output. Further, by sequentially applying other operations to the operation result as required, a final totalization result can be obtained. In this case, since the operation result is output upon each execution of the operation, it becomes possible to confirm how the two-dimensional data has been transformed, to thereby ensure manipulative capability comparable to that of spreadsheet software. In addition, those operation contents designated for specifying operations are recorded in the designation order thereof.

Meanwhile, in performing the same totalization for the same or different two-dimensional data, the recorded operation contents are sequentially read out, and one operation is selectively activated from among the plurality of operations based on the operation type, input target and output target. At this time, since the operation to be selectively activated is for a row(s) or a column(s) of two-dimensional data, the desired totalization can be performed even for such two-dimensional data that is not in conformity to a relational model, to thereby ensure data reusability.

Here, by storing the operation contents as two-dimensional data, it becomes possible to perform the same totalization for other two-dimensional data by rewriting the input target corresponding to a predetermined operation type.

Further, the input target and output target of the operation may be designated upexecution-time of the operation, when a specific identifier is included in the operation contents. In this way, the input target and output target are designated upexecution-time of the operation, to thereby provide versatility and to further improve manipulative capability.

Moreover, the input target and the output target of the operation may be specified by another two-dimensional data. In this way, it becomes possible to readily change the input target and output target by rewriting the two-dimensional data.

Other objects and aspects of the present invention will become more apparent from the following description of a preferred embodiment when read in conjunction with the accompanying drawings.

BRIEF DESCRIPTION OF THE DRAWINGS

FIG. 25 is a schematic explanatory view of a file selection screen;

FIG. 27 is an explanatory view of a cross-totalization table as a totalization target;

FIG. 30 is an explanatory view of a totalization table applied with the row-to-column conversion;

FIG. 33 is an explanatory view of a totalization table applied with the value-designated row extraction;

FIG. 36 is an explanatory view of a totalization table applied with the keyed totalization;

FIG. 37 is an explanatory view of an operation string table;

FIG. 39 is an explanatory view of the operation string table including a rewritten input target;

FIG. 40 is an explanatory view of a file designation screen;

FIG. 41 is an explanatory view of another cross-totalization table as an operation target;

FIG. 42 is an explanatory view of yet another cross-totalization table as an operation target;

FIG. 43 is an explanatory view of a totalization table totalized by executing the operation string table; and FIG. 44 is an explanatory view of a table-name table.

PREFERRED EMBODIMENT

There will be described hereinafter the present invention, with reference to the accompanying drawings.

Figure 1:
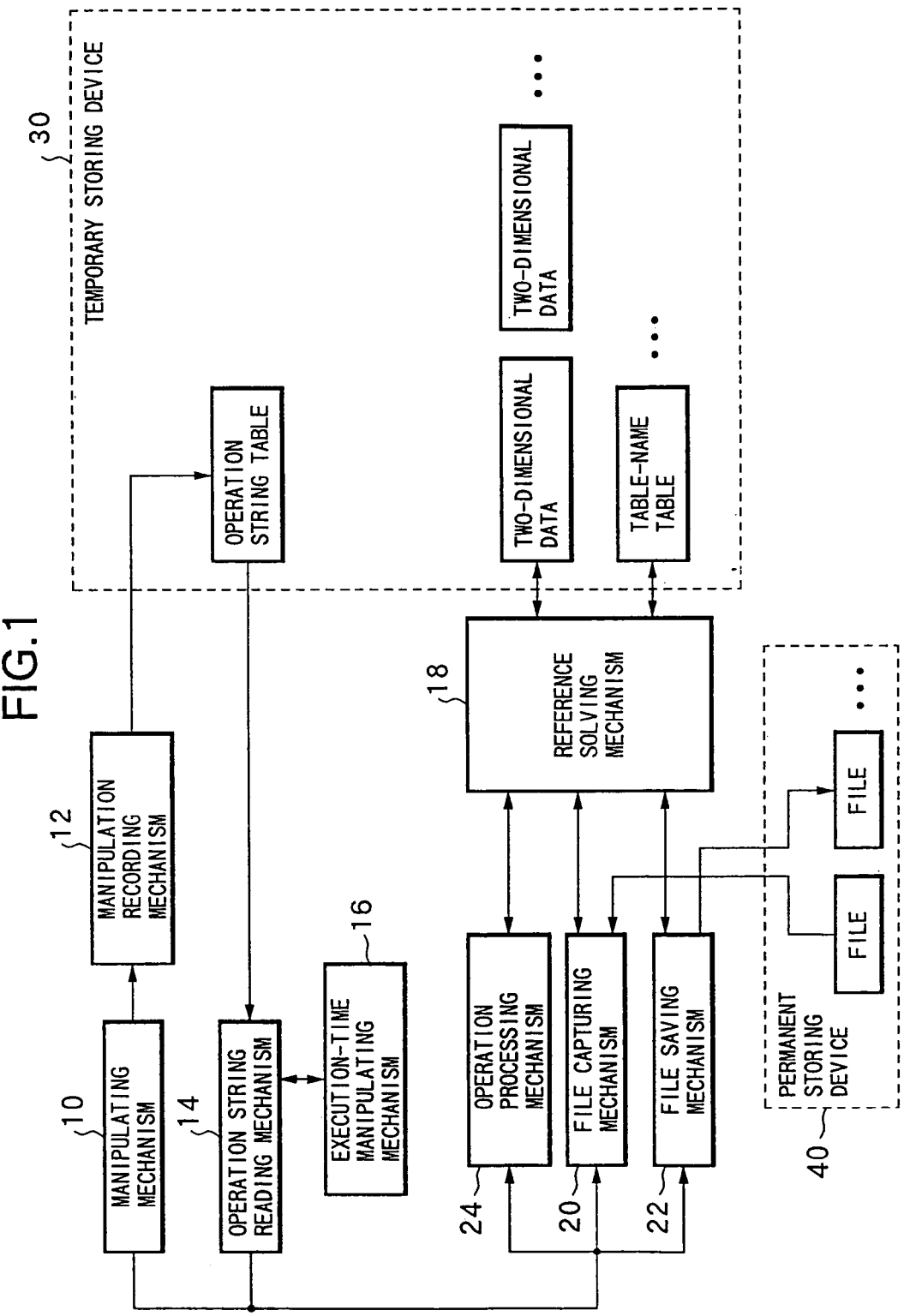
FIG. 1 is a system constitution view of a two-dimensional data processing apparatus according to the present invention.

FIG. 1 shows a system constitution of a two-dimensional data processing apparatus (hereinafter called "data processing apparatus") embodying a two-dimensional data processing technique according to the present invention. This data processing apparatus is constructed on a computer system comprising at least a central processing unit (CPU) and a memory, and is realized by a program loaded in the memory in a software manner.

The data processing apparatus comprises a manipulating mechanism 10, a manipulation recording mechanism 12, an operation string reading mechanism 14, an execution-time manipulating mechanism 16, a reference solving mechanism 18, a file capturing mechanism 20, a file saving mechanism 22, and an operation processing mechanism 24.

Figure 2:
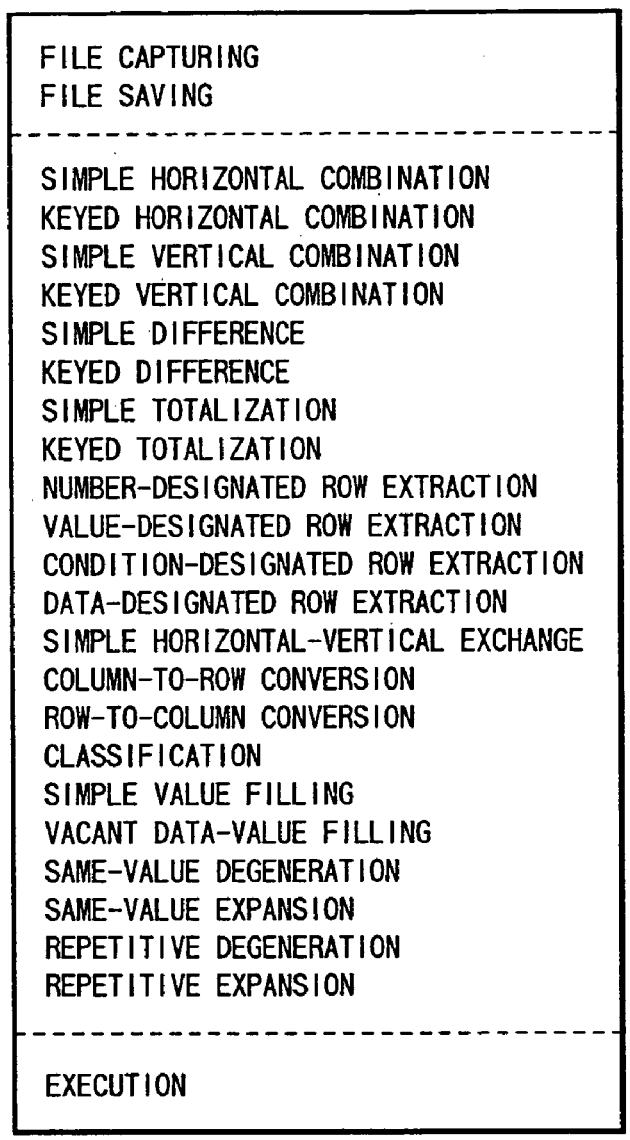
FIG. 2 is an explanatory view of a menu displayed by a manipulating mechanism.

In the manipulating mechanism 10, there is provided a user interface for a human operator, via menu displayed on a screen. Namely, a function possessed by the manipulating mechanism 10 displays a menu as shown in FIG. 2. When an item is selected from the menu, there is displayed a parameter input screen for inputting various parameters required for executing the item. When the various parameters are input in the parameter input screen, suitable one of the file capturing mechanism 20, file saving mechanism 22 and operation processing mechanism 24 is activated with the input designation values as parameters. Note, the manipulating mechanism 10 realizes designating means, a designating step and a designating function.

In the manipulation recording mechanism 12, the operation contents processed by the manipulating mechanism 10, i.e., the manipulated contents performed by the human operator, are recorded into a temporary storing device 30 constituted of such as a memory, as an "operation string table". Herein, the "operation string table" means a table that represents operation contents to be specified by at least an operation type, an input target and an output target, in a table format in time series. Note, the manipulation recording mechanism 12 realizes recording means, a recording step and a recording function.

In the operation string reading mechanism 14, the operation string table is read out from the temporary storing device 30, and the operation contents of respective rows of the operation string table are sequentially analyzed. If the operation type is file capturing and its input target is an execution-time menu displaying mark (identifier), the execution-time manipulating mechanism 16 is activated so that a human operator can designate a file as the input target. On the other hands, in case of other operation types, suitable one of the file capturing mechanism 20, file saving mechanism 22 and operation processing mechanism 24 is activated with at least the input target and output target as parameters. Note, the operation string reading mechanism 14 realizes activating means, an activating step and an activating function.

In the execution-time manipulating mechanism 16, there is displayed a file designation screen for designating a file. If at least one file is designated in the file designation screen, the file capturing mechanism 20 is activated with the designated file name (input target) and output target as parameters. Note, the execution-time manipulating mechanism 16 realizes execution-time designating means, an execution-time designating step and an execution-time designating function.

In the reference solving mechanism 18, there is managed interrelation of an input target or output target with its entity between the file capturing mechanism 20, file saving mechanism 22 and operation processing mechanism 24, and the temporary storing device 30, so that the entity is treated an access target from the designated table name. Particularly, when the entity of the input target is a table-name table (to be detailed later herein), the entities represented by a plurality of table names in the table-name table are sequentially treated as access targets. Further, when the entity of the output target is the table-name table, other tables having sequentially generated names are generated and accessed and then the generated names are sequentially recorded into the table-name table.

In the file capturing mechanism 20, there is executed processing for a situation where the operation type is file capturing. Namely, based on the input target of the parameters passed at the activation of this file capturing mechanism 20, a file is read out from a permanent storing device 40 constituted of such as a hard disk. Further, two-dimensional data is(are) spread over the temporary storing device 30, via the reference solving mechanism 18. Here, the two-dimensional data are preferably spread over the temporary storing device 30, separately for each output target (such as each sheet).

In the file saving mechanism 22, there is executed processing for a situation where the operation type is file saving. Namely, based on the input target of the parameters passed at the activation of this file saving mechanism 22, two-dimensional data are read out from the temporary storing device 30 via the reference solving mechanism 18. Further, the two-dimensional data are saved, as a file to be specified by the output target, into the permanent storing device 40. Here, when the file to be specified by the output target has been already saved in the permanent storing device 40, it is preferable to display a message box for designating whether the file may be overwritten or not.

In the operation processing mechanism 24, various operations are executed for the two-dimensional data on the temporary storing device 30, corresponding to items selected from the menu. Namely, the result of various operations (to be shown hereinafter) performed for one or two piece of two-dimensional data to be specified by the input target is output as one or more piece of two-dimensional data to be specified by the output target.

FIG. 2 is an example of a menu to be displayed on the input screen. Users are possible to select each processing from the displayed menu, to thereby freely convert a tabular format and display or output the same. There will be now concretely explained each processing, based on FIGS. 3 through 24.

Figure 3:
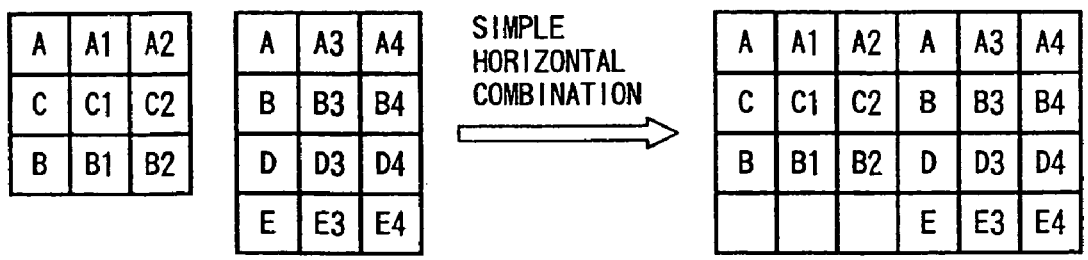
FIG. 3 is a schematic explanatory view of a simple horizontal combining operation.

In "simple horizontal combination" as shown in FIG. 3, there is executed an operation in which two pieces of two-dimensional data are input, and these data are converted into one piece of two-dimensional data where the these data are simply combined in a row direction. Here, the "simple horizontal combination" is applicable to two pieces of two-dimensional data the numbers of rows and/or columns of which are different from each other. In this case, vacant data (represented by a space in the figure, and the same rule applies corresponding to the following) is set in each of cells where the numbers of rows and/or columns are different from each other.

Figure 4:
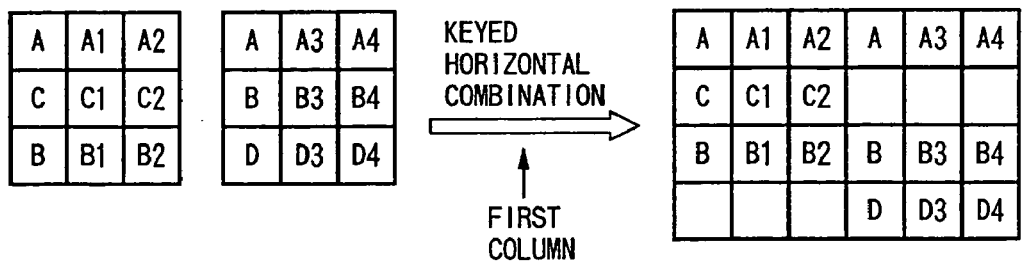
FIG. 4 is a schematic explanatory view of a keyed horizontal combining operation.

In "keyed horizontal combination" as shown in FIG. 4, there is executed an operation in which two pieces of two-dimensional data are input and these data are converted into one piece of two-dimensional data such that those rows in which the values of the designated respective columns as keys are the same are combined in the row direction, and other rows are arranged at corresponding positions. Here, vacant data is set in each vacant cell where the values the keyed designated columns are not same. Further, when there is a plurality of rows in which the values in the keyed designated columns are the same, these rows are spread sequentially from the above.

Figure 5:
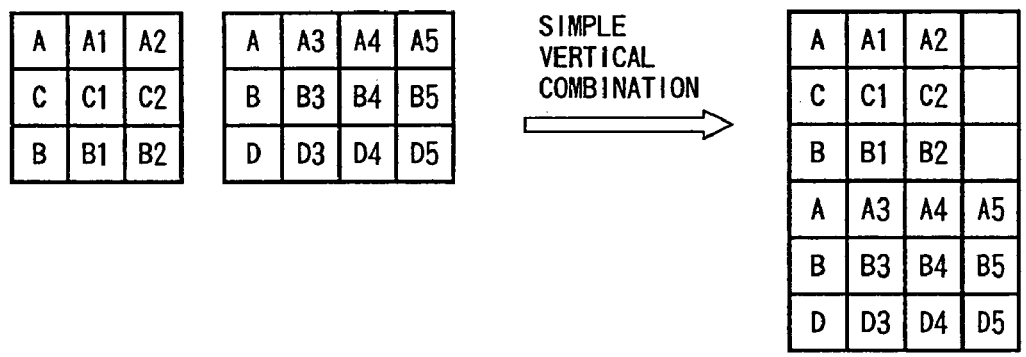
FIG. 5 is a schematic explanatory view of a simple vertical combining operation.

In "simple vertical combination" as shown in FIG. 5, there is executed an operation in which two pieces of two-dimensional data are input, and these data are converted into one piece of two-dimensional data where these data are simply combined in a column direction. Here, the "simple vertical combination" is applicable to two pieces of two-dimensional data the numbers of rows and/or columns of which are different from each other. In this case, vacant data is set in each of cells where the numbers of rows and/or columns are different from each other.

Figure 6:
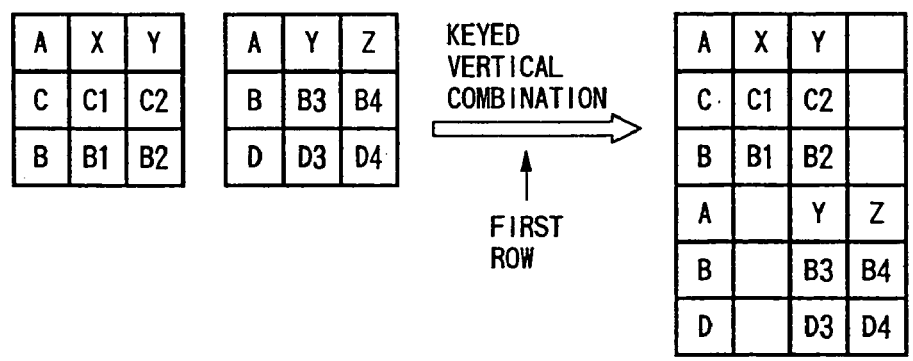
FIG. 6 is a schematic explanatory view of a keyed vertical combining operation.

In "keyed vertical combination" as shown in FIG. 6, there is executed an operation where two pieces of two-dimensional data are input and these data are converted into one piece of two-dimensional data such that those columns in which the values of the keyed designated rows are the same, are combined in the column direction and other columns are arranged at corresponding positions. Here, vacant data is set in each of vacant cells where the values of the keyed designated rows are not same. Further, when there is a plurality of columns in which the values in the keyed designated rows are the same, these columns are spread sequentially from the left.

Figure 7:
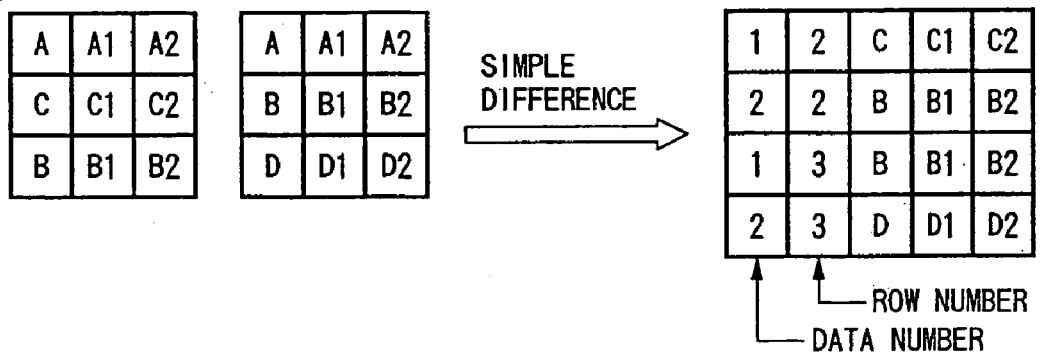
FIG. 7 is a schematic explanatory view of a simple difference operation.

In "simple difference" as shown in FIG. 7, there is executed an operation in which two pieces of two-dimensional data are input and these data are converted into one piece of two-dimensional data such that, as a result that the respective rows of the respective data are compared with each other sequentially from the above, when contents of the compared rows are not the same, those data numbers, row numbers and row contents of these different rows are spread in the row direction. Here, the "simple difference" is applicable to two pieces of two-dimensional data the numbers of rows and/or columns of which are different from each other.

Figure 8:
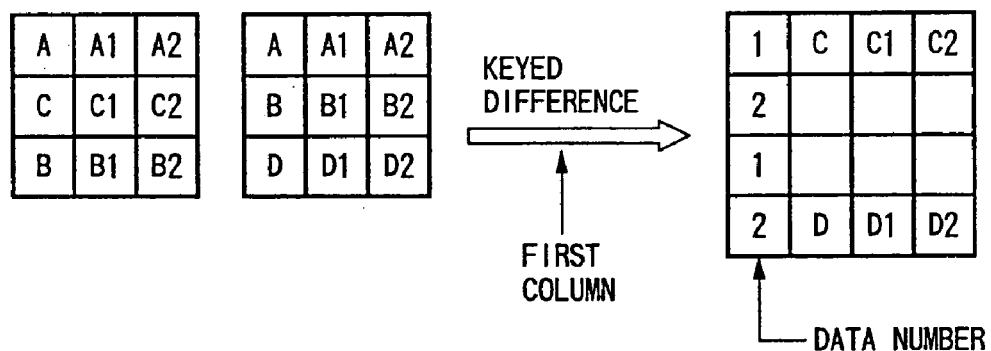
FIG. 8 is a schematic explanatory view of a keyed difference operation.

In "keyed difference" as shown in FIG. 8, there is executed an operation in which two pieces of two-dimensional data are input and, by comparing rows having same key values with each other in these data, these data are converted into one piece of two-dimensional data as follows. Namely, concerning key values existing in both pieces of two-dimensional data, the respective data numbers and contents are spread in the row direction, only when the row contents are inconsistent with each other. Further, concerning a key value existing in only one of the two pieces of two-dimensional data, the data number and vacant data of the non-existing side data are spread in the row direction, and the data number and contents of the other (existing side) data are spread in the row direction. Further, when there is a plurality of rows in which the values in the keyed designated columns are the same, these rows are spread sequentially from the above.

Figure 9:
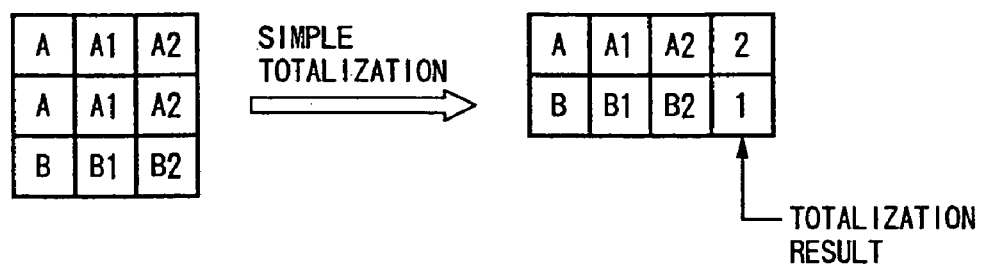
FIG. 9 is a schematic explanatory view of a simple totalizing operation.

In "simple totalization" as shown in FIG. 9, there is executed an operation in which one piece of two-dimensional data is input, and this data is converted into another piece of two-dimensional data obtained by counting the number of rows having the same contents to combine the counted results in the row direction.

Figure 10:
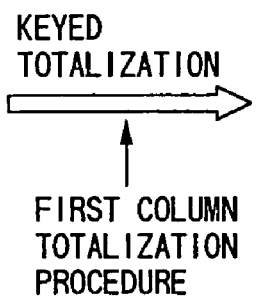
FIG. 10 is a schematic explanatory view of a keyed totalizing operation.

In "keyed totalization" as shown in FIG. 10, there is executed an operation in which one piece of two-dimensional data is input, and this data is converted into another piece of two-dimensional data obtained by combining a totalization result based on the designated key column and/or designated totalization procedure, in the row direction. Namely, for those rows in which the keyed designated columns have the same values, there is performed totalization such as the counting of rows or the sum or average of values in a particular column. Contrary, for those rows in which the keyed designated column have not the same values, there is performed totalization for the rows only. Then, for the values in the designated columns, the totalization results are combined in the row direction.

Figure 11:
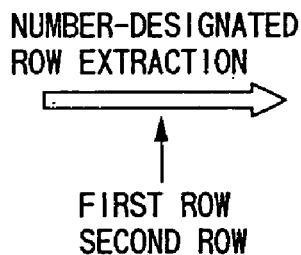
FIG. 11 is a schematic explanatory view of a number-designated row extracting operation.

In "number-designated row extraction" as shown in FIG. 11, there is executed an operation in which one piece of two-dimensional data is input, and this data is converted into another piece of two-dimensional data obtained by extracting at least one designated row to combine this row in the column direction.

Figure 12:
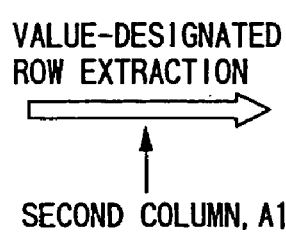
FIG. 12 is a schematic explanatory view of a value-designated row extracting operation.

In "value-designated row extraction" as shown in FIG. 12, there is executed an operation in which one piece of two-dimensional data is input, and this data is converted into another piece of two-dimensional data obtained by extracting only those rows in which the values in the designated column satisfy a designated condition to combine these rows in the column direction.

Figure 13:
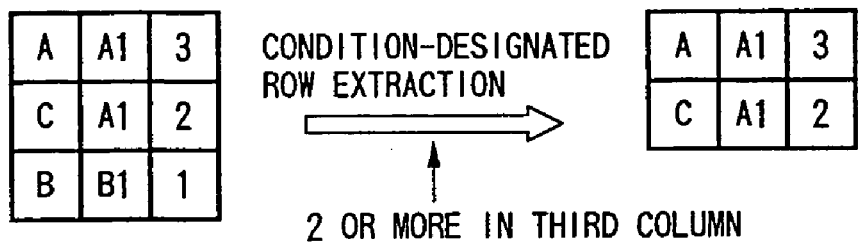
FIG. 13 is a schematic explanatory view of a condition-designated row extracting operation.

In "condition-designated row extraction" as shown in FIG. 13, there is executed an operation in which one piece of two-dimensional data is input, and this data is converted into another piece of two-dimensional data obtained by extracting only those rows in which the values in the designated columns equal to a designated value to combine these rows in the column direction.

Figure 14:
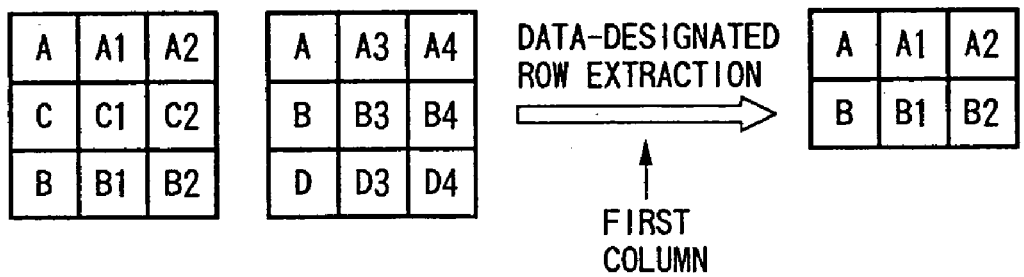
FIG. 14 is a schematic explanatory view of a data-designated row extracting operation.

In "data-designated row extraction" as shown in FIG. 14, there is executed an operation in which two pieces of two-dimensional data are input, and these data are converted into another piece of two-dimensional data obtained by extracting only rows in a first two-dimensional data from the two-dimensional data in which the values in the keyed designated columns are the same, to combine the extracted rows in the column direction.

Figure 15:
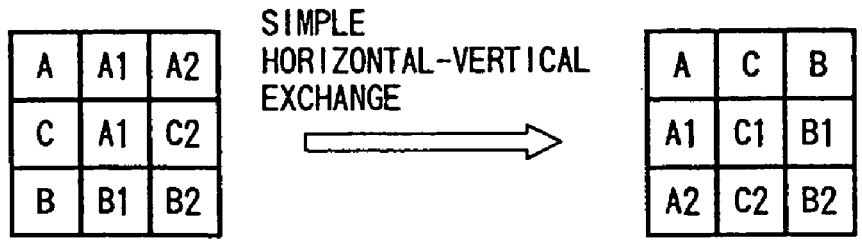
FIG. 15 is a schematic explanatory view of a simple horizontal-vertical converting operation.

In "simple horizontal-vertical exchange" as shown in FIG. 15, there is executed an operation in which one piece of two-dimensional data is input, and this data is converted into another piece of two-dimensional data obtained by exchanging the rows and columns.

Figure 16:
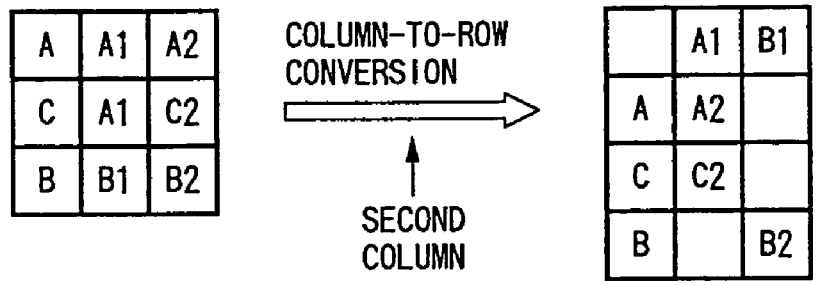
FIG. 16 is a schematic explanatory view of a column-to-row converting operation.

In "column-to-row conversion" as shown in FIG. 16, there is executed an operation in which a first piece of two-dimensional data is input, and this data is converted into a second piece of two-dimensional data obtained by spreading those columns after the designated column of the first piece of two-dimensional data, into a cross-totalization table. Here, vacant data is set in each of cells in the second piece of two-dimensional data that become vacant as a result of the spread into the cross-totalization table.

Figure 17:
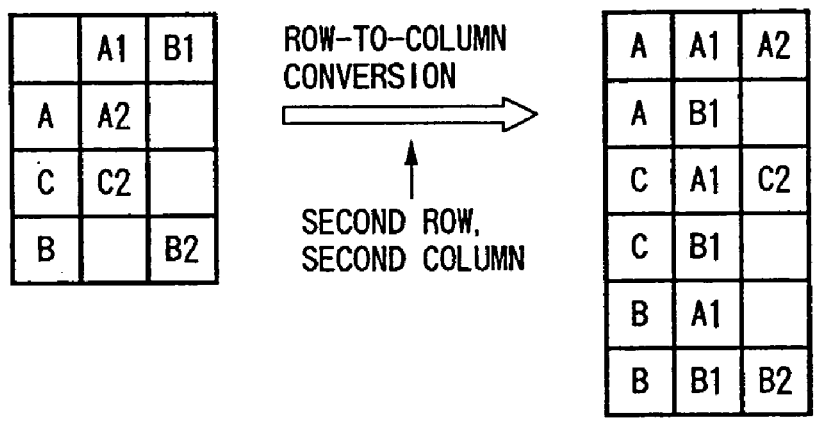
FIG. 17 is a schematic explanatory view of a row-to-column converting operation.

In "row-to-column conversion" as shown in FIG. 17, there is executed an operation in which a cross-totalization table as one piece of two-dimensional data is input, and this table is converted into another piece of two-dimensional data obtained by spreading those data after the designated position, into a table in the column direction.

Figure 18:
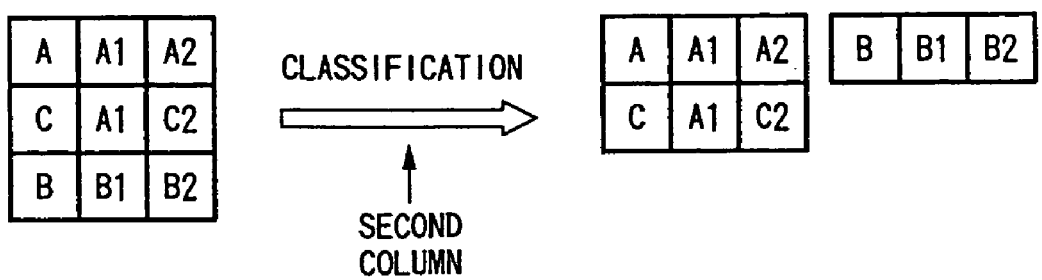
FIG. 18 is a schematic explanatory view of a classifying operation.

In "classification" as shown in FIG. 18, there is executed an operation in which one piece of two-dimensional data is input, and the rows in which the values in the keyed designated columns are the same are combined to output the two-dimensional data of the number of key values.

Figure 19:
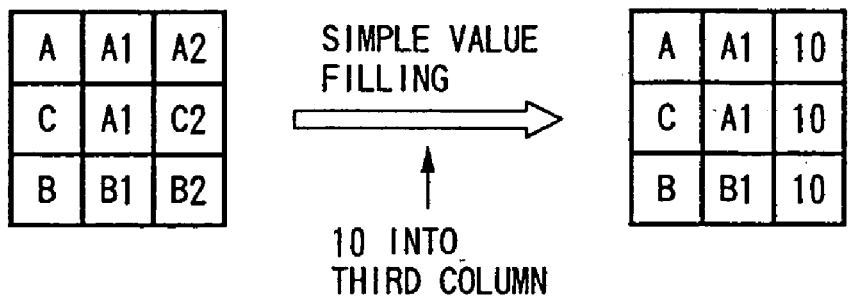
FIG. 19 is a schematic explanatory view of a simple value filling operation.

In "simple value filling" as shown in FIG. 19, there is executed an operation in which one piece of two-dimensional data is input, and this data is converted into another piece of two-dimensional data obtained by filling the designated value into the designated column.

Figure 20:
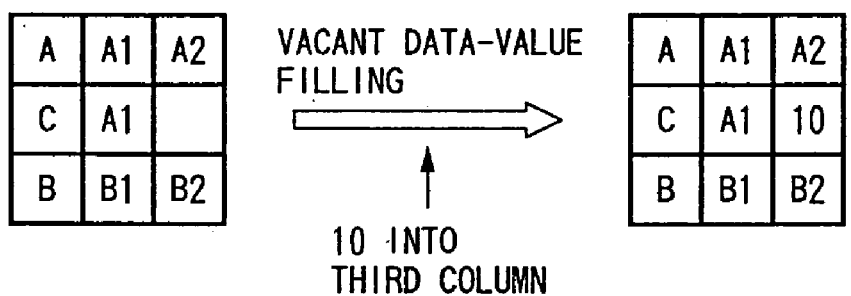
FIG. 20 is a schematic explanatory view of a vacant data-value filling operation.

In "vacant data-value filling" as shown in FIG. 20, there is executed an operation in which one piece of two-dimensional data is input, and this data is converted into another piece of two-dimensional data obtained by filling the designated value into each vacant cell in the designated column.

Figure 21:
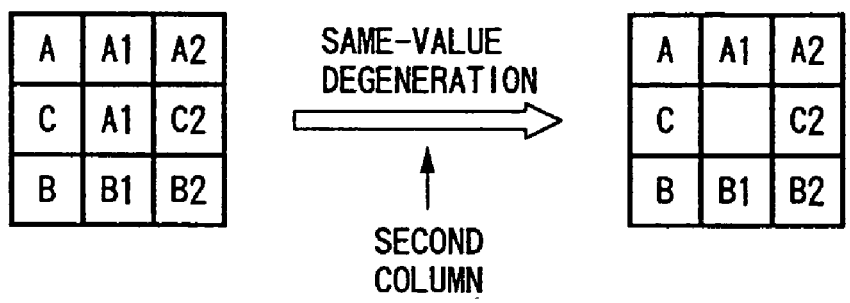
FIG. 21 is a schematic explanatory view of a same-value degenerating operation.

In "same-value degeneration" as shown in FIG. 21, there is executed an operation in which one piece of two-dimensional data is input, and this data is converted into another piece of two-dimensional data obtained by changing the values in the designated columns from the second row onward to vacant data, when there exist those continuos rows in which the values in the designated column are the same.

Figure 22:
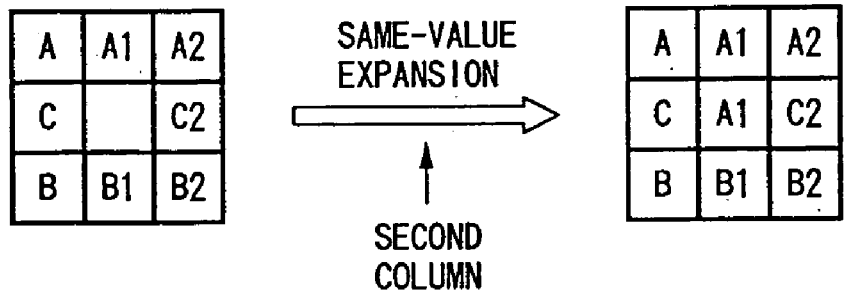
FIG. 22 is a schematic explanatory view of a same-value expanding operation.

In "same-value expansion" as shown in FIG. 22, there is executed an operation in which one piece of two-dimensional data is input, and when the value in the designated column is vacant data, this data is converted into another piece of two-dimensional data obtained by filling a value in the designated column of the preceding row, into the vacant designated column.

Figure 23:
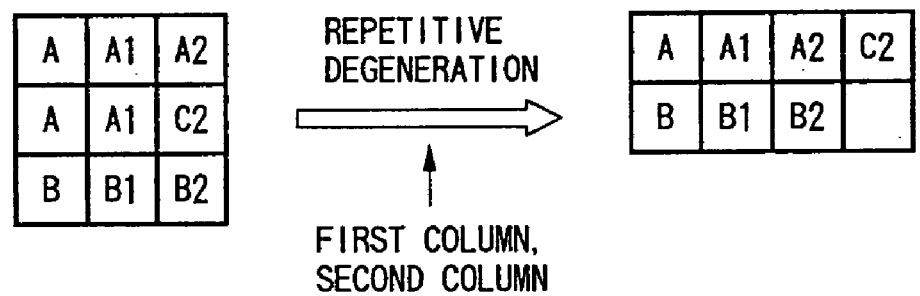
FIG. 23 is a schematic explanatory view of a repetitive degenerating operation.

In "repetitive degeneration" as shown in FIG. 23, there is executed an operation in which one piece of two-dimensional data is input, and this data is converted into another piece of two-dimensional data obtained by degenerating contents of those rows in which the values in the designated key column(s) are the same, into one row.

Figure 24:
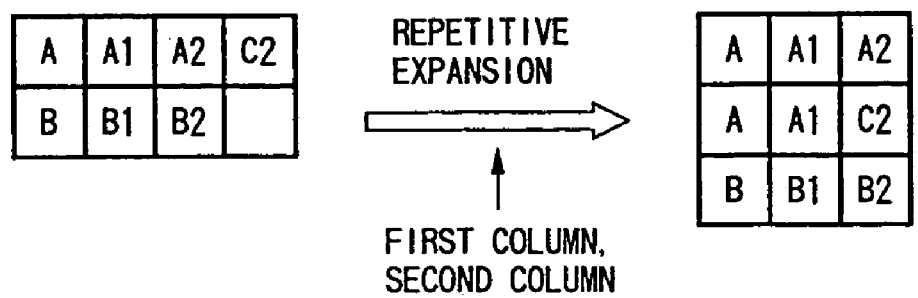
FIG. 24 is an explanatory view of a repetitive expanding operation.

In "repetitive expansion" as shown in FIG. 24, there is executed an operation in which one piece of two-dimensional data is input, and this data is converted into another piece of two-dimensional data obtained by spreading each row into those repetitive rows in which the values in the designated key columns are the same.

Note, the file capturing mechanism 20, file saving mechanism 22 and operation processing mechanism 24 cooperatively realize operating means, an operating step and an operating function.

There will be described hereinafter a totalization task according to the data processing apparatus having the aforementioned constitution, with reference to screen images.

Figure 26:
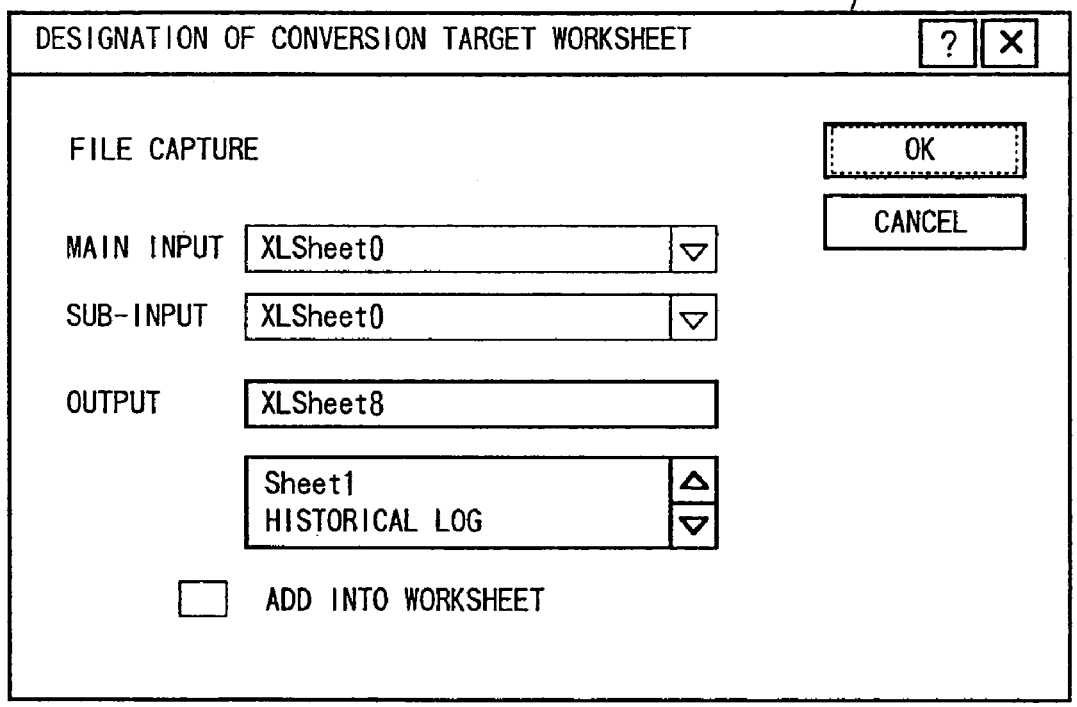
FIG. 26 is an explanatory view of a worksheet designating screen for capturing a file.

When "File Capturing" is selected from the menu shown in FIG. 2, a file selection screen 50 is displayed as shown in FIG. 25. In the file selection screen 50, when an "Open" button is pushed after selecting a two-dimensional data file as a totalization target, a worksheet designation screen 52 is displayed as shown in FIG. 26. In the worksheet designation screen 52, there is designated an output destination of two-dimensional data spread by capturing a file, i.e., there is designated an arbitrary worksheet name. Further, in the worksheet designation screen 52, when an "OK" button is pushed after designating the worksheet name as the output destination, two-dimensional data is displayed in a format of a cross-totalization table 54 as shown in FIG. 27.

Figure 27:
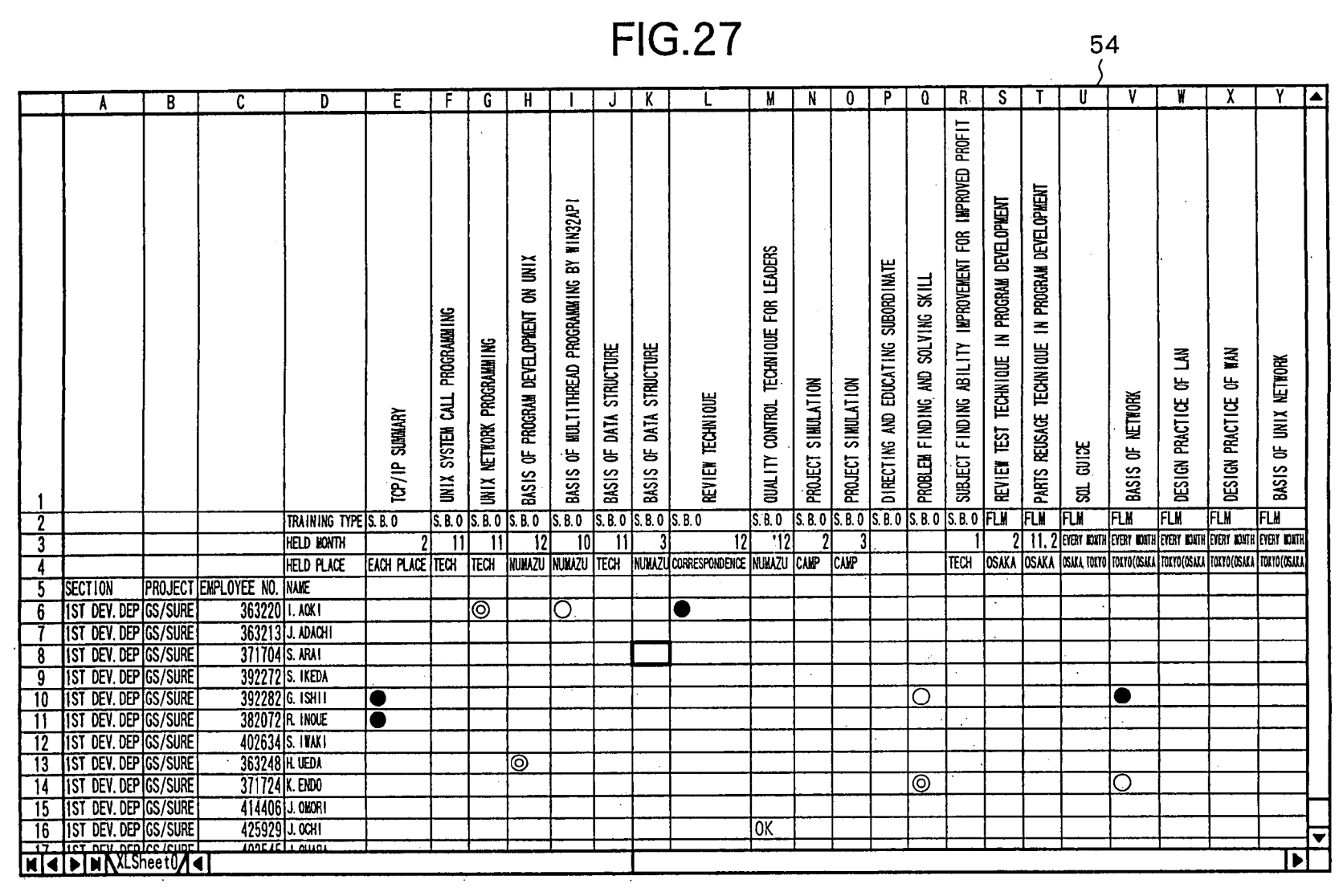

In the cross-totalization table 54 shown in FIG. 27 herein, the ordinate represents names of employees and the abscissa represents names of training seminars, in which the marks double circle, single circle and black dot indicate seminars to be attended in this term, to be attended in the next term, and having been attended, respectively. In the description hereinafter, it is assumed that there will be totalized the number of seminar attendants in the seminars to be held in this term.

Figure 28:
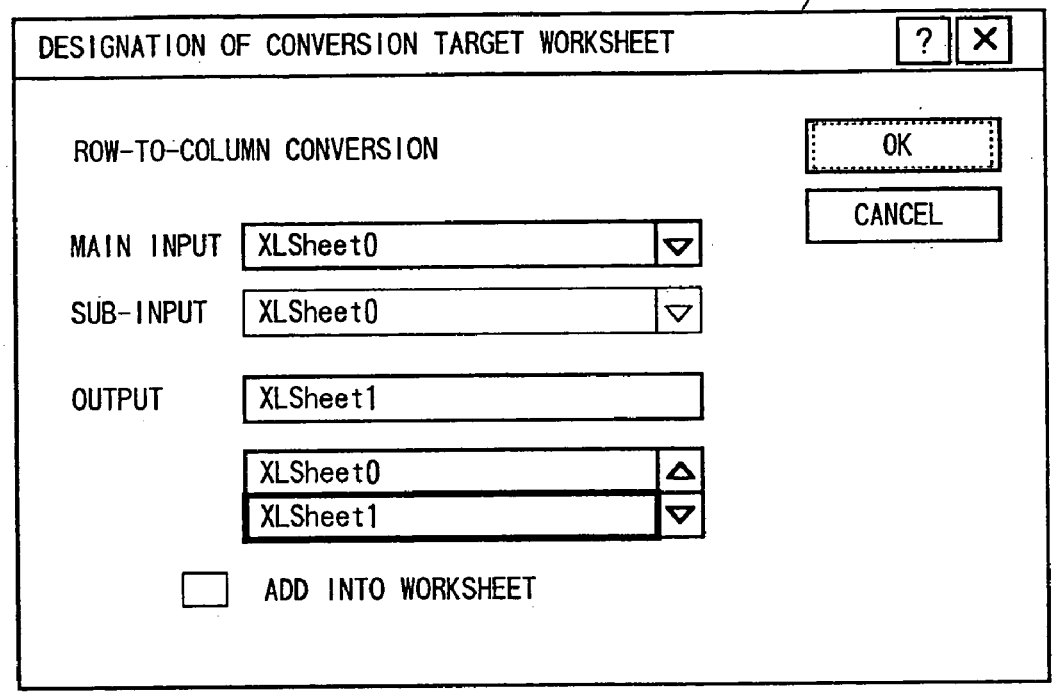
FIG. 28 is an explanatory view of a worksheet designating screen for row-to-column conversion.
Figure 29:
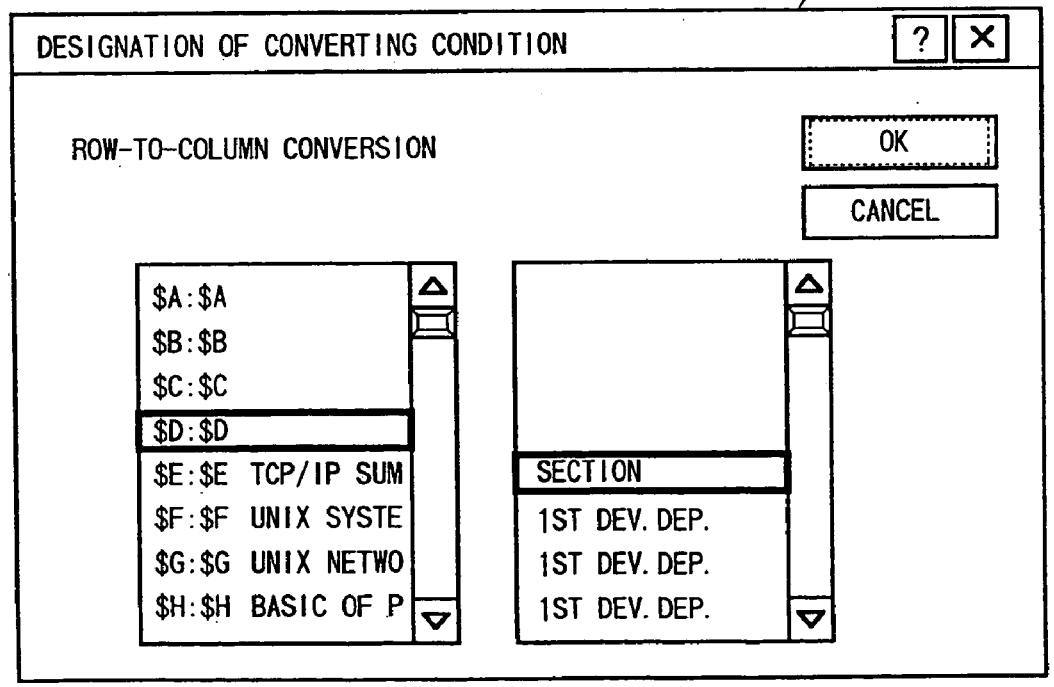
FIG. 29 is an explanatory view of a conversion condition designating screen for row-to-column conversion.

Firstly, when "Row-to-Column Conversion" is selected from the menu shown in FIG. 2, there is displayed a worksheet designation screen 56 as shown in FIG. 28 for designating an input target and an output target. In the worksheet designation screen 56, there is displayed a convert condition designating screen 58 shown in FIG. 29, when an "OK" button is pushed after designating, as the input target, the worksheet name for which the cross-totalization table 54 of FIG. 27 is displayed, and as the output target, an arbitrary worksheet name. In the convert condition designating screen 58, there are designated a column number and its caption as well as a row caption, so as to specify the upper left cell of a region for which the row-to-column conversion is to be performed. Then, when an "OK" button is pushed after performing the region designation, there is executed the row-to-column conversion for the cross-totalization table 54 shown in FIG. 27, and a totalization table 60 shown in FIG. 30 is displayed in the worksheet designated as the output target.

Figure 31:
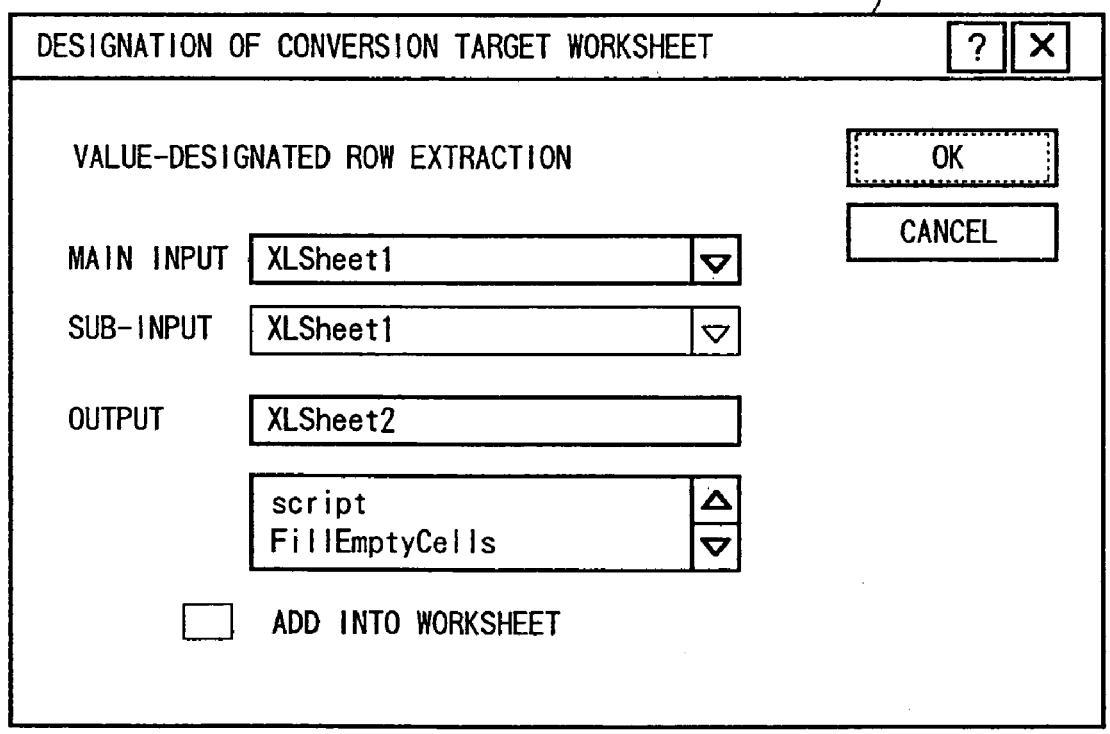
FIG. 31 is an explanatory view of a worksheet designating screen for value-designated row extraction.
Figure 32:
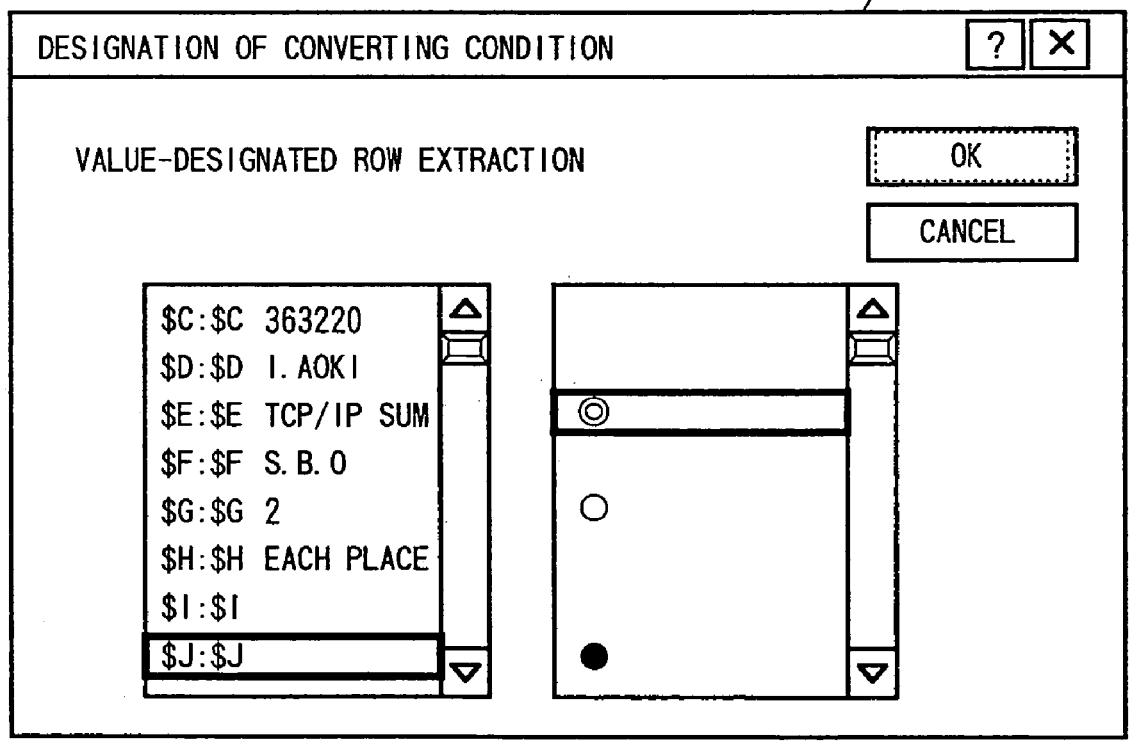
FIG. 32 is an explanatory view of a conversion condition designating screen for value-designated row extraction.

Next, when "Value-Designated Row Extraction" is selected from the menu shown in FIG. 2 so as to extract only those training seminars to be attended in this term, there is displayed a worksheet designation screen 62 shown in FIG. 31. In the worksheet designation screen 62, there is displayed a convert condition designating screen 64 shown in FIG. 32, when an "OK" button is pushed after designating, as the input target, the worksheet name for which the totalization table 60 of FIG. 30 is displayed, and as the output target, an arbitrary worksheet name. In the convert condition designating screen 64, there are designated a column number and its caption as well as its value, as an extracting condition for performing the value-designated row extraction. Then, when an "OK" button is pushed after setting the extracting condition, there is executed the value-designated row extraction for the totalization table 60 shown in FIG. 30, and a totalization table 66 shown in FIG. 33 is displayed in the worksheet designated as the output target.

Figure 34:
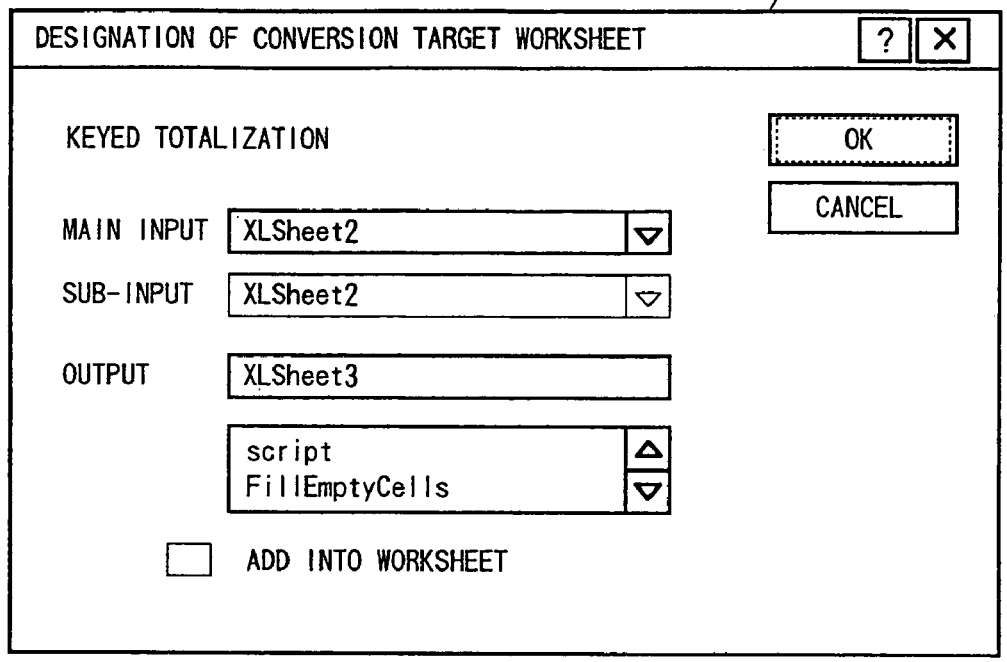
FIG. 34 is an explanatory view of a worksheet designating screen for keyed totalization.
Figure 35:
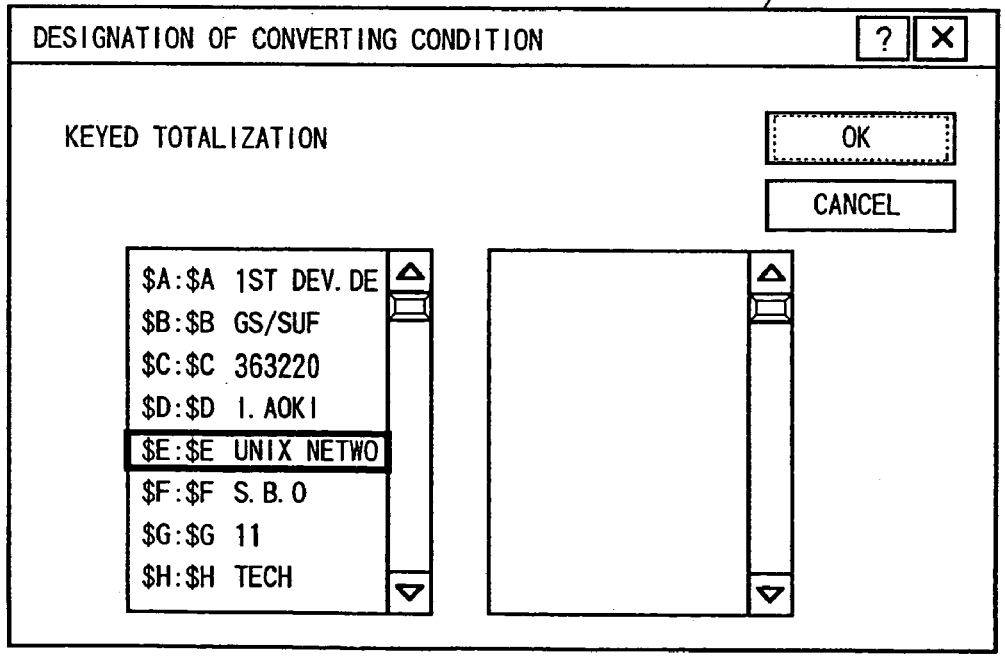
FIG. 35 is an explanatory view of a conversion condition designating screen for keyed totalization.

Next, when "Keyed Totalization" is selected from the menu shown in FIG. 2 so as to perform totalization with the seminar name as a key in the totalization table 66 shown in FIG. 33, there is displayed a worksheet designation screen 68 as shown in FIG. 34. In the worksheet designation screen 68, when an "OK" button is pushed after designating, as the input target, the worksheet name for which the totalization table 66 of FIG. 33 is displayed, and as an output target, an arbitrary worksheet name, there is displayed a convert condition designating screen 70 as shown in FIG. 35. In the convert condition designating screen 70, there are designated a column number and its caption indicating the seminar name. Then, when an "OK" button is pushed after designating the column number and its caption, there is executed the keyed totalization for the totalization table 66 shown in FIG. 33, and a totalization table 72 shown in FIG. 36 is displayed in the worksheet designated as the output target.

Referring to the totalization table 72 shown in FIG. 36, there has been totalized the number of attendants in each training seminar to be attended in this term. In this way, it becomes possible to readily calculate a budget required for training employees, for example.

In accordance with the series of manipulations as described above, an operation string table 74 as shown in FIG. 37 is stored in the temporary storing device 30. In this operation string table 74, each operation type, input targets, output targets and converting conditions are spread in the row direction. Further, since this operation string table 74 is a kind of totalization table, this table 74 can be saved as a file into the permanent storing device 40 by selecting "File Saving" in the menu. In this case, it is possible to read out the operation string table 74 from the permanent storing device 40 at a desired time point.

Thus, in performing totalization in a manner conforming to a predetermined rule for two-dimensional data, when one operation among a plurality of previously defined operations is selectively applied to the two-dimensional data, the operation result is displayed on a screen. Further, by sequentially applying other operations to the operation result as required, it becomes possible to obtain a desired totalization result. In this case, since the operation result is displayed for each execution of the operation, it becomes possible to confirm how the two-dimensional data has been transformed, to thereby ensure manipulative capability comparable to that of spreadsheet software. In addition, those operation contents designated so as to specify operations are recorded in the designated order, so as to be utilized as a macro.

The following is to be performed, when the operation string table 74 saved in the temporary storing device 30 is used as a macro so as to again perform the totalization task as the previous.

Figure 38:
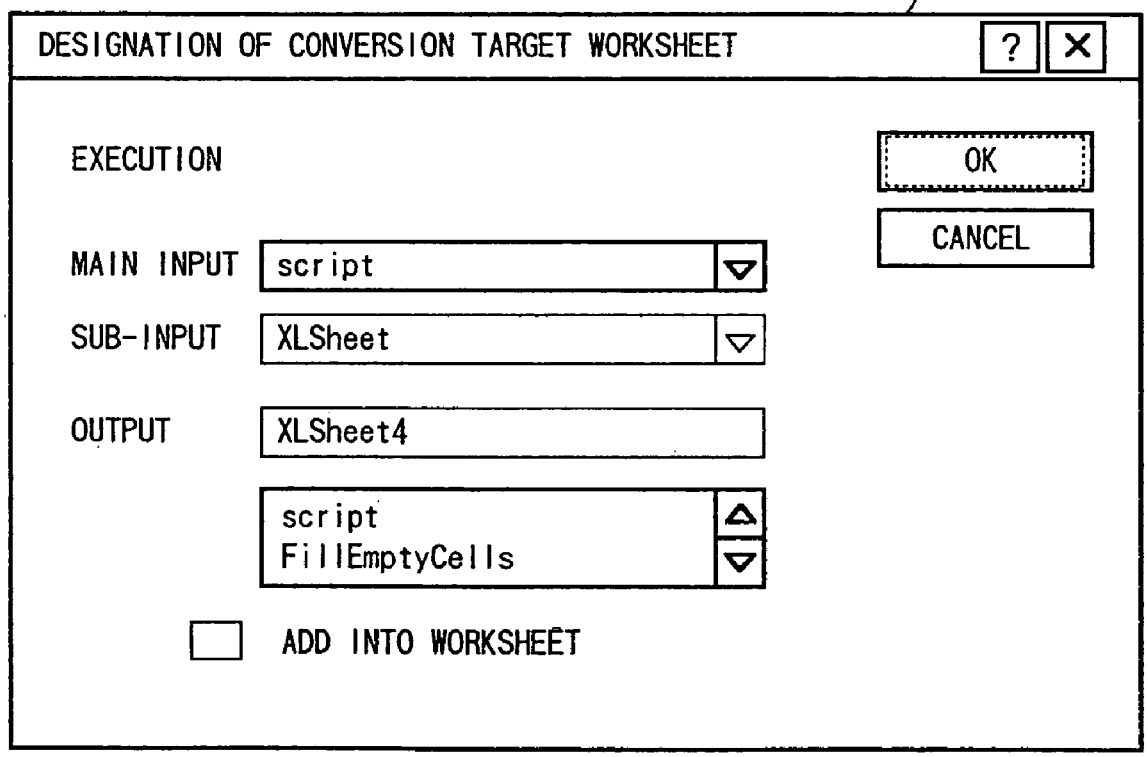
FIG. 38 is an explanatory view of a worksheet designating screen for execution.

"Execution" is selected from the menu shown in FIG. 2, there is displayed a worksheet designation screen 76 as shown in FIG. 38. In the worksheet designation screen 76, when an "OK" button is pushed after designating, as the input target, the worksheet name for which the operation string table 74 is displayed, there are sequentially executed those aforementioned operations to thereby provide the totalization table 72 shown in FIG. 36.

Further, in case of performing a similar totalization task by changing the totalization target, there is selected the "Execution" from the menu shown in FIG. 2, after rewriting the input target described in the 1st row in the 2nd column in the operation string table 74 shown in FIG. 37. Thus, the two-dimensional data file specified by the thus rewritten input target is read out when executing the 1st row of the operation string table 74, and similar operations are sequentially executed in the next row and onward, to thereby obtain an intended totalization table as a final result.

In order to enable designation of totalization target at execution time, the input target described in the 1st row in the 2nd column of the operation string table 74 shown in FIG. 37 is rewritten to an execution-time menu displaying mark "%" as shown in FIG. 39 representing a command to display a file designation screen. Then, when "Execution" is selected from the menu shown in FIG. 2, there is displayed a file designation screen 78 shown in FIG. 40. In the file designation screen 78, when an "Open" button is pushed after designating such as two two-dimensional data files ("Minagawa.xls" shown in FIG. 41 and "Sato.xls" shown in FIG. 42), those designated files are captured and the similar operations are sequentially executed so that a totalization table 80 as shown in FIG. 43 can be obtained. If a plurality of files have been designated at that time, the results thereof are merged to obtain a single totalization table.

The file designated via the file designation screen 78 at execution time of the operation string table 74 is saved into the temporary storing device 30, as a table-name table 82 as shown in FIG. 44. Namely, when the files are designated in the file designation screen 78 shown in FIG. 40 in executing the operation string table 74, there are specified actual input targets based on the thus prepared table-name table 82.

Namely, in performing the same totalization for the same or different two-dimensional data, the recorded operation string table 74 is read out, and one operation is selectively activated from among multiple operations, based on the operation type, input target and output target. At this time, since the operation to be selectively activated is for a row(s) or a column(s) of two-dimensional data, the desired totalization can be performed even for such two-dimensional data that is not in conformity with a relational model, to thereby ensure data reusability.

By recording a program for realizing such a function into a computer readable recording medium such as a magnetic tape, magnetic disk, magnetic drum, IC card, CD-ROM, and DVD-ROM, the two-dimensional data processing program according to the present invention can be distributed into the market. Further, those who have obtained such a recording medium are possible to readily construct the two-dimensional data processing apparatus according to the present invention, making use of a general computer system.

What is claimed:

1. A two-dimensional data processing apparatus comprising:
    operating means for inputting two-dimensional data, and for outputting one piece of two-dimensional data obtained after an entirety of rows or columns of said input two-dimensional data is subjected selectively to one of a plurality of predefined operations, including one or more operations for converting tabular formats between rows and columns, the one piece of two-dimensional data having a different tabular format from the input two-dimensional data;
    designating means for designating an operation type which specifies said operation by said operating means, and an input target and an output target of said operation;
    recording means for recording at least one set of operation contents in the designated order of said operation contents, with the operation type, input target and output target designated through said designating means being one set of operation contents; and
    activating means for sequentially reading out said operation contents recorded by said recording means, and for selectively activating one operation for said operating means based on the operation type, input target and output target of said operation contents.

2. The two-dimensional data processing apparatus of claim 1, wherein said recording means records said operation contents as two-dimensional data.

3. The two-dimensional data processing apparatus of claim 1, further comprising:
    execution-time designating means for designating the input target and the output target of said operation by said operating means, at execution time of said operation; and
    wherein said activating means selectively activates one operation of said operating means based on the input target and the output target designated by said execution-time designating means, when a specific identifier is included in said operation contents recorded by said recording means.

4. The two-dimensional data processing apparatus of claim 1, wherein the input target and the output target of said operation by said operating means are specified by another piece of two-dimensional data.

5. A two-dimensional data processing method comprising:
    inputting two-dimensional data, and outputting one piece of two-dimensional data obtained after an entirety of rows or columns of said input two-dimensional data is subjected selectively to one of a plurality of predefined operations, including one or more operations for converting tabular formats between rows and columns, the one piece of two-dimensional data having a different tabular format from the input two-dimensional data;
    designating an operation type which specifies one of the plurality of predefined operations, and an input target and an output target of the specified operation;
    recording at least one set of operation contents in the designated order of said operation contents, with the operation type, input target and output target being one set of operation contents; and
    sequentially reading out said operation contents, and selectively activating the specified operation based on the operation type, input target and output target of said operation contents.

6. The two-dimensional data processing method of claim 5, wherein said recording records said operation contents as two-dimensional data.

7. The two-dimensional data processing method of claim 5, further comprising:
    designating the input target and the output target of the specified operation at an execution time of the specified operation; and
    selectively activating the specified operation based on the input target and the output target designated, when a specific identifier is included in said operation contents recorded by said recording.

8. The two-dimensional data processing method of claim 5, wherein the input target and the output target of the specified operation are specified by another piece of two-dimensional data.

9. A computer readable recording medium recorded with a two-dimensional data processing program for rendering a computer to perform:
    inputting two-dimensional data, and outputting one piece of two-dimensional data obtained after an entirety of rows or columns of said input two-dimensional data is subjected selectively to one of a plurality of predefined operations, including one or more operations for converting tabular formats between rows and columns, the one piece of two-dimensional data having a different tabular format from the input two-dimensional data;
    designating an operation type which specifies one of the plurality of predefined operations, and an input target and an output target of the specified operation;
    recording at least one set of operation contents in the designated order of said operation contents, with the operation type, input target and output target being one set of operation contents; and
    sequentially reading out said operation contents, and for selectively activating the specified operation based on the operation type, input target and output target of said operation contents.

10. The computer readable recording medium recorded with a two-dimensional data processing program of claim 9, wherein said recording records said operation contents as two-dimensional data.

11. The computer readable recording medium recorded with a two-dimensional data processing program of claim 9, further comprising:

designating the input target and the output target of the specified operation at execution time of the specified operation; and selectively activating the specified operation based on the input target and the output target designated, when a specific identifier is included in said operation contents recorded by said recording.

12. The computer readable recording medium recorded with a two-dimensional data processing program of claim 9, wherein the input target and the output target of the specified operation are specified by another piece of two-dimensional data.

* * * * *